US009557801B2

(12) United States Patent
Nomura et al.

(10) Patent No.: US 9,557,801 B2
(45) Date of Patent: Jan. 31, 2017

(54) CACHE DEVICE, CACHE SYSTEM AND CONTROL METHOD

(71) Applicant: KABUSHIKI KAISHA TOSHIBA, Minato-ku, Tokyo (JP)

(72) Inventors: Kumiko Nomura, Kanagawa (JP); Shinobu Fujita, Tokyo (JP); Keiko Abe, Kanagawa (JP); Kazutaka Ikegami, Kanagawa (JP); Hiroki Noguchi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 306 days.

(21) Appl. No.: 13/772,518

(22) Filed: Feb. 21, 2013

(65) Prior Publication Data
US 2013/0246818 A1    Sep. 19, 2013

(30) Foreign Application Priority Data
Mar. 13, 2012    (JP) .................................. 2012-056359

(51) Int. Cl.
G06F 1/32    (2006.01)
(52) U.S. Cl.
CPC ............... *G06F 1/3275* (2013.01); *G06F 1/32* (2013.01); *G06F 1/3225* (2013.01); *Y02B 60/1225* (2013.01); *Y02B 60/1228* (2013.01)
(58) Field of Classification Search
CPC .................. G06F 1/32; G06F 1/28; G06F 1/26
(Continued)

(56) References Cited

U.S. PATENT DOCUMENTS 3,920,977 A *  11/1975  Karsas ................... G06F 11/20
                                                              379/2
8,214,618 B2 *  7/2012  Jeong ..................... G06F 12/10
                                                              711/154
(Continued)

FOREIGN PATENT DOCUMENTS

JP        2004-185576        7/2004

OTHER PUBLICATIONS

Gerosa, G. et al., "A Sub-1W to 2W Low-Power IA Processor for Mobile Internet Devices and Ultra-Mobile PCs in 45nm Hi-K Metal Gate CMOS," ISSCC 2008, Session 13, Mobile Processing 13.1, pp. 256-257 and 611 (2008).

(Continued)

*Primary Examiner* — Phil Nguyen
*Assistant Examiner* — Keshab Pandey
(74) *Attorney, Agent, or Firm* — Finnegan, Henderson, Farabow, Garrett & Dunner LLP

(57) ABSTRACT

According to an embodiment, a cache device includes a cache memory, an access controller, and a power controller. The cache memory includes a plurality of memory areas associated with a plurality of ways, respectively. The access controller controls access to the memory areas. The power controller controls power supplied to each of the memory areas individually such that power supplied to a memory area that has not been accessed for a predetermined time is standby power that is lower than operating power that enables the memory area to operate. The power controller controls power supplied to a memory area such that standby power for a memory area that is highly likely to be accessed has a value closer to the operating power than a value of standby power for a memory area that is less likely to be accessed.

8 Claims, 16 Drawing Sheets

(58) Field of Classification Search
USPC .............. 713/300, 310, 320, 321, 322, 323, 324,713/330, 340, 375
See application file for complete search history.

(56) References Cited

U.S. PATENT DOCUMENTS

| | | | |
|---|---|---|---|
| 2005/0210206 A1* | 9/2005 | Woodbridge et al. ........ | 711/154 |
| 2006/0075193 A1* | 4/2006 | Magoshi ....................... | 711/122 |
| 2006/0288241 A1* | 12/2006 | Felter et al. .................. | 713/300 |
| 2009/0067229 A1* | 3/2009 | Kang ....................... | G11C 8/06 365/163 |
| 2010/0332714 A1* | 12/2010 | Tomita ................ | G06F 13/4018 710/307 |
| 2011/0145609 A1* | 6/2011 | Berard et al. ................. | 713/320 |
| 2012/0144144 A1* | 6/2012 | Worthington ....... | G06F 12/0223 711/165 |
| 2012/0233377 A1 | 9/2012 | Nomura et al. | |
| 2012/0246412 A1 | 9/2012 | Nomura et al. | |

OTHER PUBLICATIONS

Notice of Rejection issued by the Japanese Patent Office on Oct. 1, 2013, for Japanese Patent Application No. 2012-056359, and English-language translation thereof.

\* cited by examiner

CACHE DEVICE, CACHE SYSTEM AND CONTROL METHOD

CROSS-REFERENCE TO RELATED APPLICATION

This application is based upon and claims the benefit of priority from Japanese Patent Application No. 2012-056359, filed on Mar. 13, 2012; the entire contents of which are incorporated herein by reference.

FIELD

Embodiments described herein relate generally to a cache device, a cache system and a control method.

BACKGROUND

There has been a demand for reducing power consumption of system as a whole in recent years. Accordingly, power consumption of computing devices as parts of such systems also needs to be reduced. For example, a power consumption reduction technique of suppressing total power consumption by repeating operation of lowering power to be supplied to a processor element itself when a CPU is not operating and resuming supply of power when operation is resumed has been considered.

Furthermore, even when the CPU is operating, power consumption can be further reduced by suppressing power consumption of a part of a cache in the CPU that is not being used. For example, it is possible to lower the power consumption by controlling power supplied to each way in a cache and stopping supply of power to ways that are not being used even when the CPU is operating.

If, however, a way to which supply of power is stopped is attempted to be driven when a request for reading or writing data is received, there are disadvantages that it takes time to restore the way to an operable state and that good performance cannot be obtained.

DETAILED DESCRIPTION

According to an embodiment, a cache device includes a cache memory, an access controller, and a power controller. The cache memory includes a plurality of memory areas associated with a plurality of ways, respectively. The access controller is configured to control access to the memory areas. The power controller is configured to control power supplied to each of the memory areas individually such that power supplied to a memory area that has not been accessed for a predetermined time is standby power that is lower than operating power that enables the memory area to operate. The power controller controls power supplied to a memory area such that standby power for a memory area that is highly likely to be accessed has a value closer to the operating power than a value of standby power for a memory area that is less likely to be accessed.

Embodiments of a cache device, a cache system and a control method according to the present invention will be described in detail below with reference to the accompanying drawings.

Figure 1:
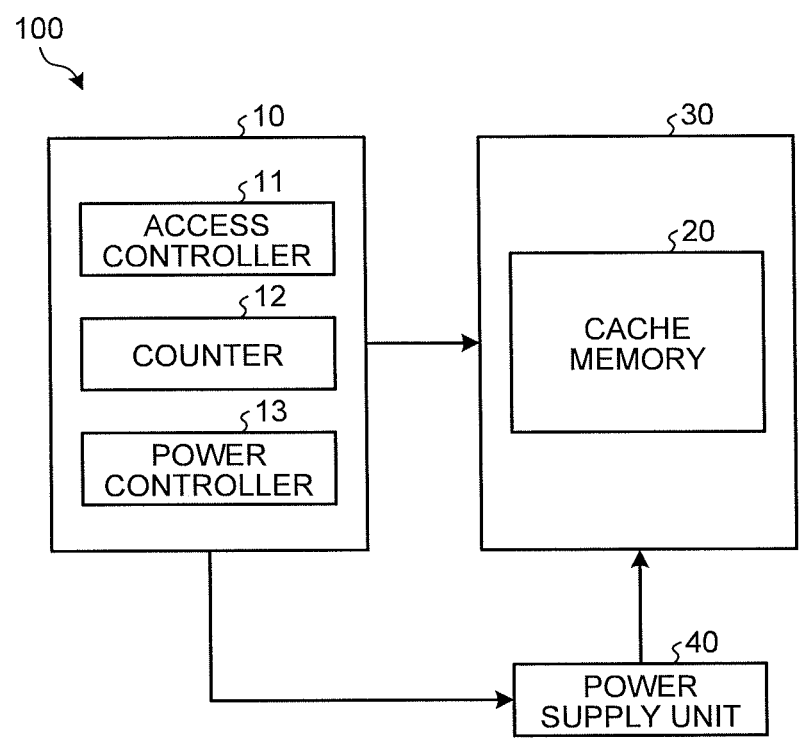
FIG. 1 is a diagram illustrating an exemplary configuration of a cache device according to a first embodiment.

FIG. 1 is a diagram illustrating an example of a schematic configuration of a cache device 100 according to the present embodiment. The cache device 100 is a storage hierarchy inserted between a processing device such as a CPU and a main storage device (main memory). From a different perspective, the cache device 100 is one component of a cache system including a processing device, the cache device 100 and a main storage device. In order to accelerate access to the main storage device, data that are likely to be accessed from the CPU and like data are held in the cache device 100. The cache device 100 in the present embodiment is a second level cache, but the cache device is not limited thereto and may be a first level cache or a third level cache.

As illustrated in FIG. 1, the cache device 100 includes a cache controller 10, a cache unit 30 including a cache memory 20, and a power supply unit 40. The cache controller 10 includes an access controller 11, a counter 12 and a power controller 13. The access controller 11 controls read/write of data from/to the cache memory 20. In other words, the access controller 11 controls access to the cache memory 20. The counter 12 counts various times. Details thereof will be described later. The power controller 13 controls the power supply unit 40 that supplies power to the cache memory 20.

Figure 2:
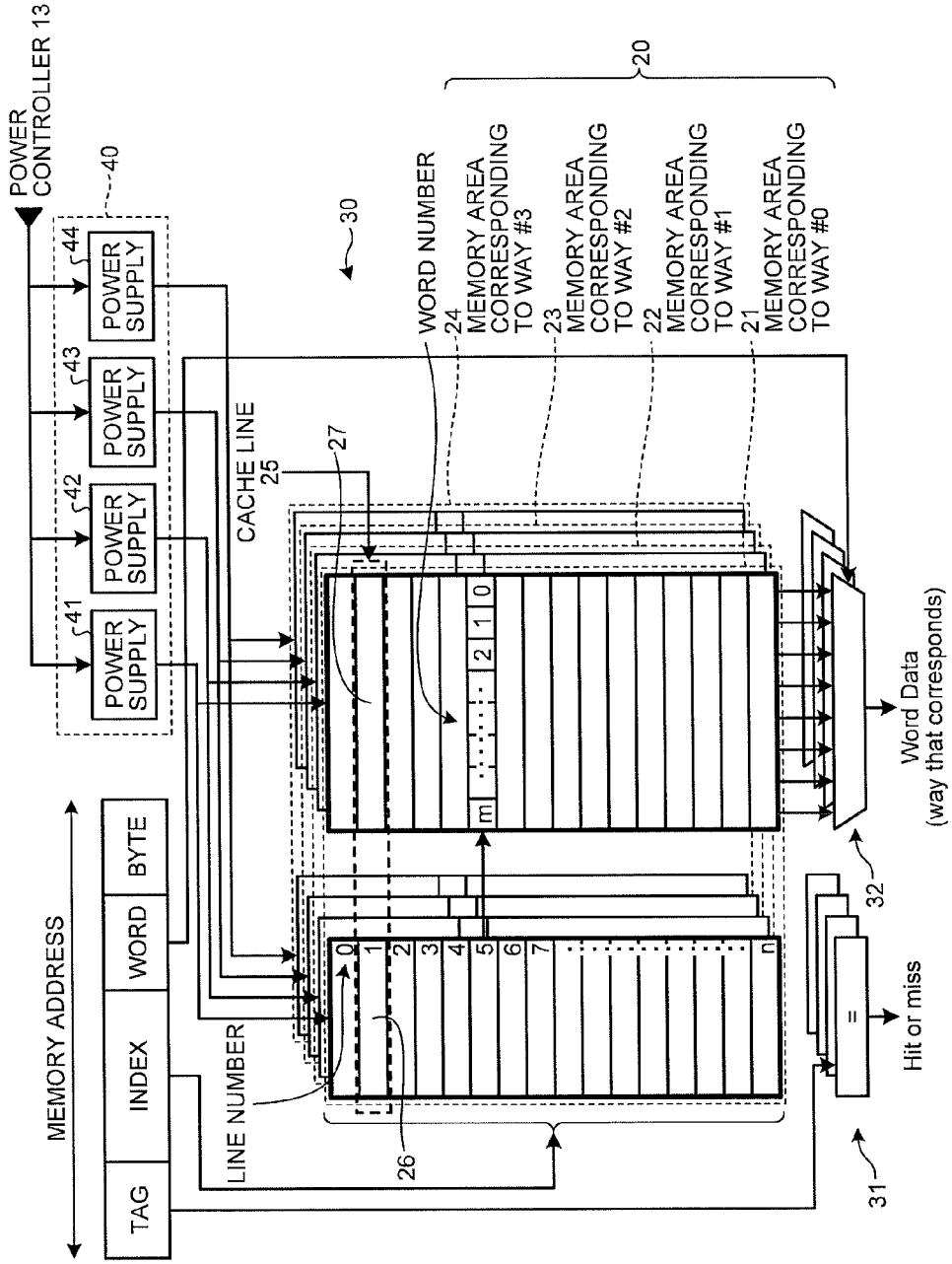
FIG. 2 is a diagram illustrating an example of part of the cache device according to the first embodiment.

FIG. 2 is a diagram for explaining an example of details of the cache unit 30. The cache device 100 according to the present embodiment is a four-way set associative cache device, and the cache memory 20 is a nonvolatile memory having four memory areas (21 to 24) that correspond to four ways, respectively. Herein, each way is assigned a number identifying the way (a number from 0 to 3 in this example), a way assigned the number "0" is expressed as a way #0, a way assigned the number "1" is expressed as a way #1, a way assigned the number "2" is expressed as a way #2, and a way assigned the number "3" is expressed as a way #3.

Note that the main storage device has a plurality of blocks having a size larger than data corresponding to one word (word data). In the present embodiment, the cache memory 20 is configured in advance so that blocks for which the likelihood (which can also be regarded as the frequency of access) of being accessed (from/to which data are highly likely to be read or written) is higher are stored in memory areas associated with ways with smaller numbers while blocks for which the likelihood of being accessed is lower are stored in memory areas associated with ways with larger numbers among the blocks of the main storage device. Thus, the memory area 21 associated with the way #0 with the smallest number is set as a memory area that are most likely to be accessed while the memory area 24 associated with the way #3 with the largest number is set as a memory area that are least likely to be accessed. Various known techniques can be used for this setting.

A specific configuration of the memory area 21 associated with the way #0 will be described as an example below, and the other memory areas associated with the other ways have similar configurations. First, the basis thereof will be described. For requesting access to the main storage device, the CPU outputs access request information (a concept including read request information and write request information, which will be described later) containing a memory address indicating a location in the main storage device for which the request is made. A memory address can also be regarded as information indicating a locating in the main storage device. As illustrated in FIG. 2, the memory address is composed of a tag representing an upper part, an index representing a middle part and a word representing a lower part. At the end of the memory address, a byte that is a plurality of bits is added. A specific configuration of the memory area 21 will be described on the basis of the above.

As illustrated in FIG. 2, the memory area 21 includes a plurality of cache lines 25. Note that each cache line 25 is assigned a line number that is common in all the ways (all the memory areas). For example, a line number "1" refers to the first cache line 25 (on the first line) in each memory area.

Each cache line 25 includes a tag part 26 and a data part 27 that are associated with each other. The tag part 26 has stored therein a tag. On the other hand, the data part 27 associated with the tag part 26 has stored therein data to be stored in a block that can be identified by the tag in the tag part 26 among a plurality of blocks of the main storage device. Herein, each block in the main storage device has stored therein a plurality of pieces of word data (data corresponding to one word), and the data part 27 has stored therein a plurality of pieces of word data to be stored in a block that can be identified by the tag in the associated tag part 26. Each piece of word data is assigned a word number that is common in all the blocks. For example, a word number "1" refers to the first piece of word data in each block. In the following description, a tag and data that are stored in one cache line 25 may also be referred to as "cache information".

The index that is a middle part of the memory address is information specifying any one of the cache lines 25. In other words, the index included in the memory address can be regarded as information specifying any one line number. The word that is a lower part of the memory address is information specifying any one of a plurality of pieces of word data included in a block. In other words, the word included in the memory address can be regarded as information specifying any one word number.

The cache information (the tag and the data) stored in each cache line 25 can be replaced among the memory areas (the ways). For example, the access controller 11 can perform swapping by which cache information pieces stored in cache lines 25 with the same line number are replaced by each other between two memory areas so that a block accessed at a timing near the present time point (a block that are highly likely to be accessed) is stored in a memory area associated with a way with a small number and a block that has not been accessed for a long time (a block that is less likely to be accessed) is stored in a memory area associated with a way with a large number. Various known techniques can be used for this swapping.

As illustrated in FIG. 2, the cache unit 30 further includes a comparing unit 31 and a selecting unit 32. The comparing unit 31 compares a tag stored in the tag part 26 of the cache line 25 specified by the index contained in the memory address output by the CPU and a tag contained in the memory address for each memory area under the control of the access controller 11. If the tag stored in the tag part 26 and the tag contained in the memory address are identical, the result is cache hit and the access controller 11 can identify the cache hit memory area (from a different perspective, the cache hit way).

The selecting unit 32 selects and outputs a piece of word data specified by a word contained in the memory address among a plurality of pieces of word data stored in the data part 27 on the cache line 25 specified by tine index contained in the memory address output by the CPU from cache hit memory areas under the control of the access controller 11.

Furthermore, as illustrated in FIG. 2, the power supply unit 40 includes four power supplies 41 to 44 associated with the four memory areas, respectively. In the example of FIG. 2, the power supply 41 is associated with the memory area 21, the power supply 42 is associated with the memory area 22, the power supply 43 is associated with the memory area 23, and the power supply 44 is associated with the memory area 24. The power controller 13 controls power supplied to each memory area individually. More specifically, the power controller 13 controls the power supply 41 to control power to be supplied to the memory area 21 associated with the way #0. The power controller 13 also controls the power supply 42 to control power to be supplied to the memory area 22 associated with the way #1. The power controller 13 also controls the power supply 43 to control power to be supplied to the memory area 23 associated with the way #2. Furthermore, the power controller 13 controls the power supply 44 to control power to be supplied to the memory area 24 associated with the way #3.

The power controller 13 also controls power to be supplied to a memory area that has not been accessed for a predetermined period to be standby power that is lower than operating power that enables the memory area to operate. More specific description thereof is given below. In the following description, a state of a memory area to which operating power is supplied may be referred to as an "operating state" while a state of a memory area to which standby power is supplied may be referred to as a "standby state".

First, functions of the counter 12 in FIG. 1 will be described. The counter 12 measures, for each memory area, an unused time representing a time period during which the memory area has not been used (a time period during which the memory area has not been accessed). When a memory access is accessed, the counter 12 resets the measured value of the unused time of the memory area to an initial value. The initial value may be any value, and may be set to "0" or "1", for example. In the present embodiment, the counter 12 includes a plurality of counters associated with the four memory areas (21 to 24), respectively, and each counter resets the measured value to the initial value when the memory area associated with the counter is accessed.

In this example, a first threshold representing a maximum value of the unused time is set for each memory area (each way). When the measured value of the unused time of a memory area associated with a certain way is equal to or larger than the first threshold, the power controller 13 controls the power supply unit 40 to supply standby power to the memory area.

Furthermore, the power controller 13 controls the power supplied to a memory area such that standby power for a memory area that is highly likely to be accessed has a value closer to the operating power than the value of standby power for a memory area that is less likely to be accessed. More specifically, the power controller 13 controls the power supply unit 40 so that the standby power to a memory area associated with a way with a smaller number becomes a value closer to the operating power. When the operating power is 1.2 V, for example, the power controller 13 can control the standby power to the memory area 21 associated with the way #0 to 0.8 V, the standby power to the memory area 22 associated with the way #1 to 0.6 V, the standby power to the memory area 23 associated with the way #2 to 0.4 V, and the standby power to the memory area 24 associated with the way #3 to 0.2 V. Note that this is one example and the value of the standby power for each memory area may be any value as long as the standby power for a memory area that is more likely to be accessed is closer to the operating power.

Herein, a state in which the operating power is supplied to all of the memory areas is referred to as a "normal operation mode", and a state in which the operating power is supplied to some memory areas while standby power is supplied to the other memory areas is referred to as a "partial standby mode).

Furthermore, a state in which standby power is supplied to all of the memory areas is referred to as an "all-standby mode". In the present embodiment, when the "all-standby mode" is entered, the access controller 11 starts measuring the standby time representing a time period during which the "all-standby mode" continues. When the measured value of the standby time is a second threshold or larger, the power controller 13 controls the power supply unit 40 to stop power supplied to all the memory areas. A state of stopping the supply of power to all the memory areas is referred to as an "off mode".

Next, exemplary operation of the cache device 100 in each mode will be described. First, the basis thereof will be described. For requesting the main storage device to read data, the CPU outputs read request information containing a memory address that can identify a location in the main storage device from which data are to be read. For requesting the main storage device to write data, on the other hand, the CPU outputs write request information containing a memory address that can identify a location in the main storage device to which data are to be written and data requested to be written.

Figure 3:
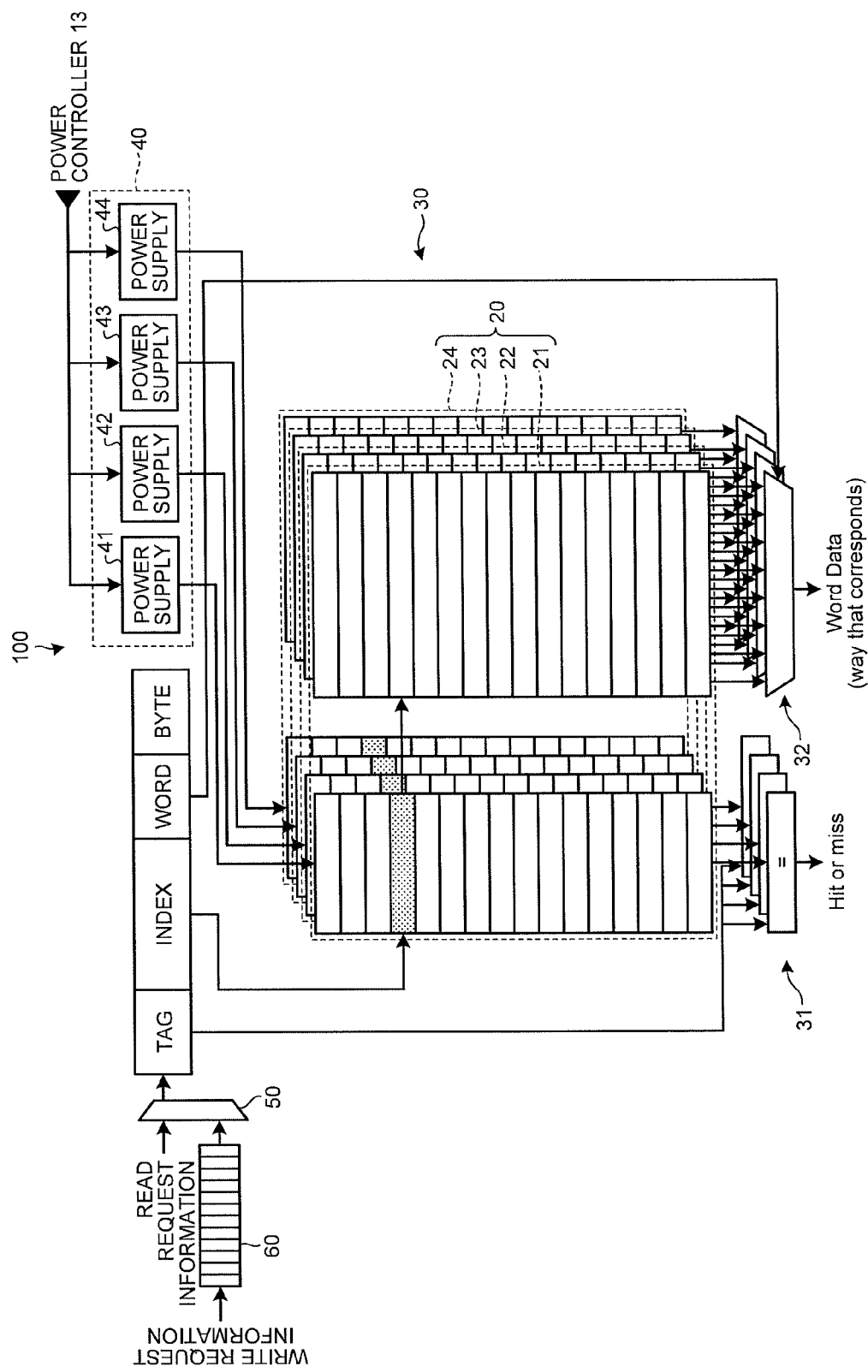
FIG. 3 is a diagram illustrating a detailed exemplary configuration of the cache device according to the first embodiment.

FIG. 3 is a diagram illustrating a detailed exemplary configuration of the cache device 100. As illustrated in FIG. 3, the cache device 100 further includes a multiplexer 50 and a first write buffer 60. The multiplexer 50 and the first write buffer 60 may be included in the cache controller 10, may be included in the cache unit 30, or may be provided separately from the cache controller 10 and the cache unit 30.

Under the control of the access controller 11, the multiplexer 50 selects any of read request information output from the CPU and information stored in the first write buffer 60. In the present embodiment, control is performed so that read request information is selected first. More specifically, when read request information is received from the CPU, the access controller 11 controls the multiplexer 50 to select the received read request information. When the read request information is selected by the multiplexer 50, the access controller 11 controls read operation based on the selected read request information.

Furthermore, each time write request information is received from the CPU, the access controller 11 writes the received write request information into the first write buffer 60. The access controller 11 then controls the multiplexer 50 to select the write request information stored in the first write buffer 60 according to the operating state of the cache device 100. For example, when no read request information has been received for a predetermined period, the access controller 11 may control the multiplexer 50 to sequentially select pieces of write request information stored in the first write buffer 60. When write request information is selected by the multiplexer 50, the access controller 11 controls write operation based on the selected write request information.

Exemplary operation of the cache device 100 in each mode will be described on the basis of the above with reference to FIGS. 4 to 9. First, an example of data read operation in the "normal operation mode" will be described with reference to FIG. 4.

Figure 4:
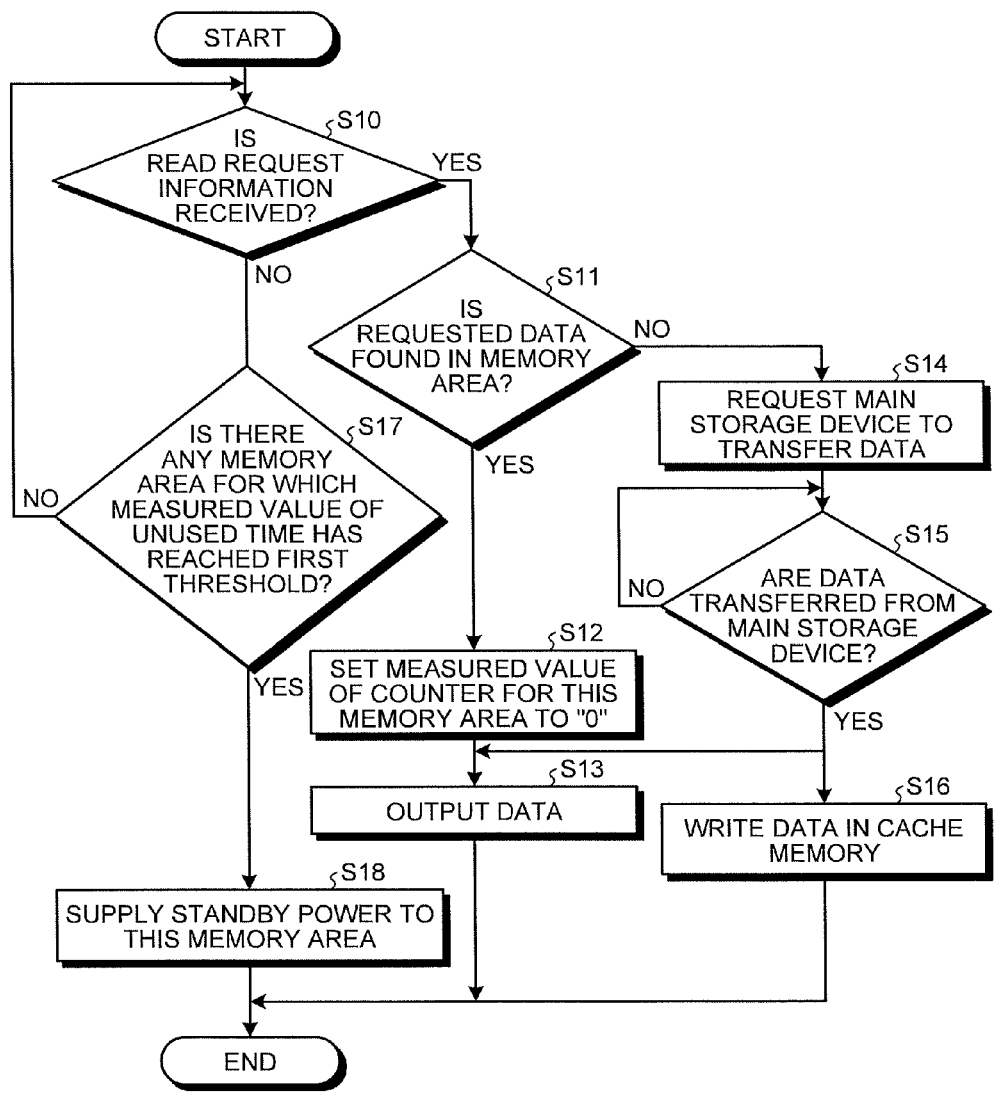
FIG. 4 is a flowchart illustrating an example of read operation in a normal operation mode according to the first embodiment.

As illustrated in FIG. 4, the access controller 11 first determines whether or not read request information is received (step S10). If it is determined that read request information is received (result of step S10: YES), the access controller 11 controls the multiplexer 50 to select the received read request information and starts control of read operation based on the received read request information. First, the access controller 11 determines whether or not the requested data exists in the memory area (whether or not a cache hit memory area exists) (step S11). If it is determined that the requested data exists in the memory area (a cache hit memory area exists) (result of step S11: YES), the access controller 11 sets (resets) the measured value of the counter for the memory area to the initial value (step S12). Next, the access controller 11 selects and outputs data stored in the data part 27 of a cache line 25 specified by the index at the middle part of the memory address contained in the read request information in the memory area (step S13). More specifically, the access controller 11 controls the selecting unit 32 to select and output word data piece specified by the word in the lower part of the memory address among a plurality of pieces of word data stored in the data part 27 of the cache line 25 specified by the index.

If it is determined in step S11 described above that the requested data does not exist in the memory area (no cache hit memory area exists) (result of step S11: NO), that is, if it is determined that the result is a mishit, the access controller 11 requests the main storage device to transfer data requested to be read (step S14). When an upper level cache (such as a third level cache) is provided, the access controller 11 may request the upper level cache to transfer data requested to be read. If data are transferred from the main storage device (or the upper level cache) (result of step S15: YES), the access controller 11 outputs data transferred from the main storage device (step S13). The access controller 11 also writes the transferred data into the cache memory 20 (step S16).

Least Recently Used (LRU) algorithm, for example, can be used to select the cache line 25 into which data transferred from the main storage device are to be written. In this case, the access controller 11 selects one of the cache lines 25 that has not been accessed for a longest time in the memory areas (21 to 24) specified by the index contained in the memory address. The access controller 11 then writes the data transferred from the main storage device into the data part 27 of the selected cache line 25, and writes the tag in the upper part of the memory address contained in the read request information into the tag part 26 of the selected cache line 25.

If it is determined in step S10 described above that no read request information is received (result of step S10: NO), on the other hand, the access controller 11 determines whether or not there is any memory area for which the measured value of the unused time has reached the first threshold (step S17). If it is determined that there is a memory area for which the measured value of the unused time has reached the first threshold (result of step S17: YES), the access controller 11 instructs the power controller 13 to perform control to change the state of the memory area from the operating state to the standby state. The instructed power controller 13 controls the power supply unit 40 to supply standby power to the memory area (step S18). In other words, the power controller 13 performs control to change the state of the memory area from the operating state to the standby state. As a result, the cache device 100 changes from the "normal operation mode" to the "partial standby mode".

Next, an example of data write operation in the normal operation mode will be described with reference to FIG. 5. An example of a case in which write operation based on one piece of write request information selected by the multiplexer 50 is performed will be described here.

Figure 5:
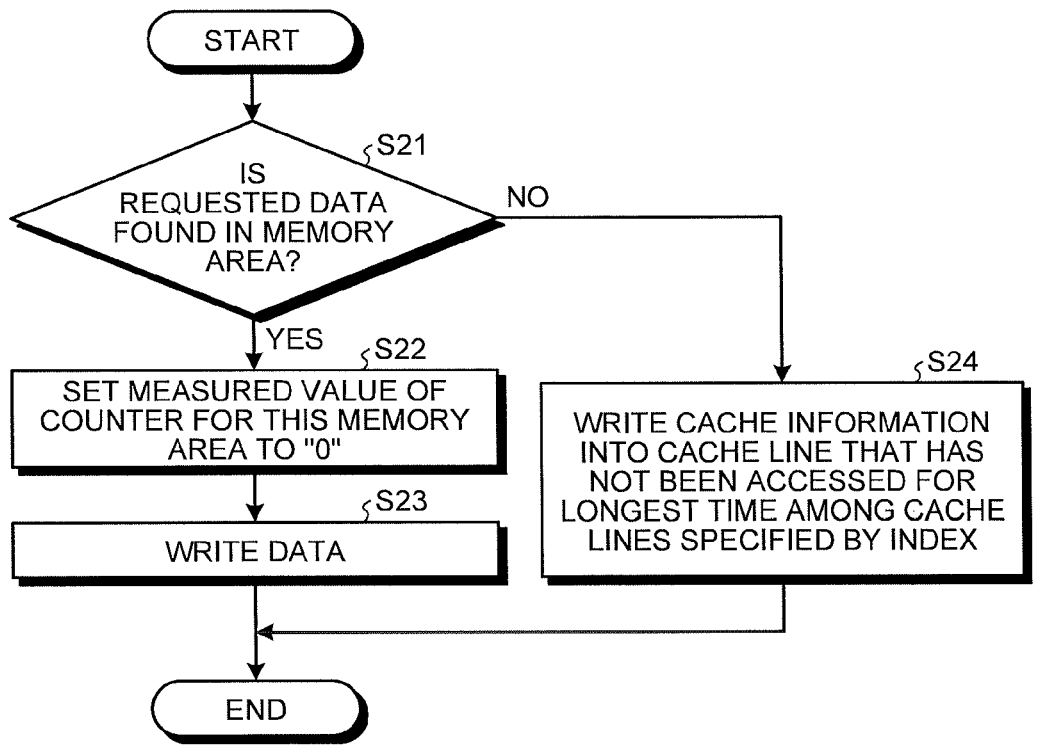
FIG. 5 is a flowchart illustrating an example of write operation in the normal operation mode according to the first embodiment.

As illustrated in FIG. 5, the access controller 11 first determines whether or not the requested data exists in the memory area (step S21). If it is determined that the requested data exists in the memory area (result of step S21: YES), the access controller 11 sets the measured value of the counter for the memory area to the initial value (step S22). Next, the access controller 11 writes data requested to be written into the data part 27 of a cache line 25 specified by the index at the middle part of the memory address contained in the write request information in the memory area (step S23).

On the other hand, if it is determined in step S21 described above that the requested data does not exist in the memory area (result of step S21: NO), that is, if it is determined that the result is a mishit, the access controller 11 writes cache information into a cache line 25 that has not been accessed for a longest time among the cache lines 25 in the memory areas specified by the index (step S24). More specifically, the access controller 11 writes the tag in the memory address contained in the write request information into the tag part 26 of the cache line 25 that has not been accessed for the longest time among the cache lines 25 of the memory areas specified by the index and writes data contained in the write request information (data requested to be written) into the data part 27 of the cache line 25.

Next, exemplary operation of the cache device 100 in the "partial standby mode" will be described. First, an example of data read operation in the partial standby mode will be described with reference to FIG. 6.

Figure 6:
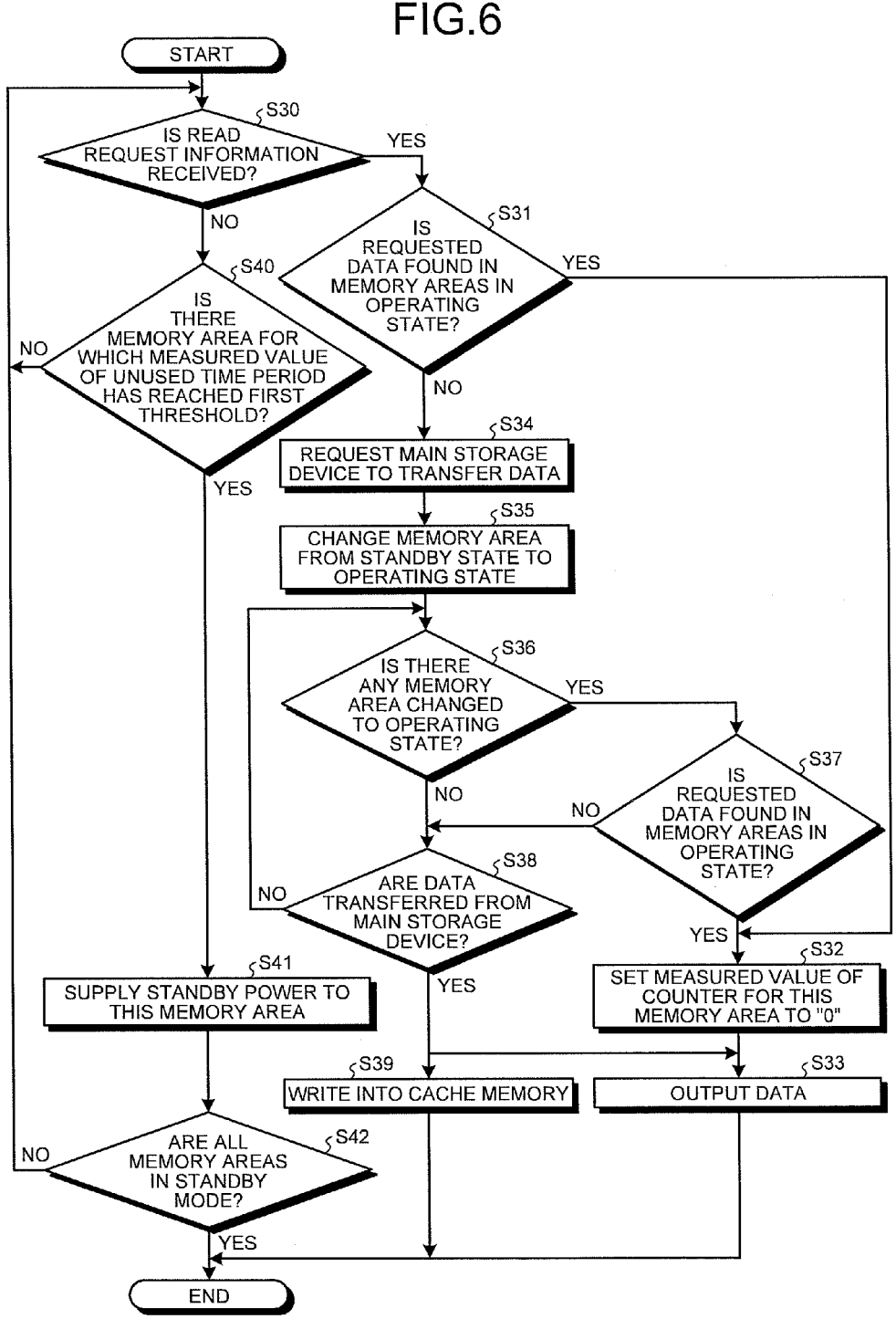
FIG. 6 is a flowchart illustrating an example of read operation in a partial standby mode according to the first embodiment.

As illustrated in FIG. 6, the access controller 11 first determines whether or not read request information is received (step S30). If it is determined that read request information is received (result of step S30: YES), the access controller 11 controls the multiplexer 50 so that the received read request information is selected and starts control of read operation based on the received read request information. First, the access controller 11 determines whether or not the requested data exists in the memory areas in the operating state (step S31). If it is determined that the requested data exists in the memory areas (result of step S31: YES), the access controller 11 sets the measured value of the counter for the memory area to the initial value (step S32). Next, the access controller 11 selects and outputs data stored in the data part 27 of a cache line 25 specified by the index of the memory address contained in the read request information in the memory area (step S33).

If it is determined in step S31 described above that the requested data does not exist in the memory areas (result of step S31: NO), that is, if it is determined that the result is a mishit, the access controller 11 requests the main storage device to transfer data requested to be read (step S34). The access controller 11 also instructs the power controller 13 to change the memory areas from the standby state to the operating state. The instructed power controller 13 changes the memory areas from the standby state to the operating state (step S35). More specifically, the power controller 13 controls the power supply unit 40 to switch power supplied to the memory areas such that the standby state thereof becomes an operating state. Next, the access controller 11 determines whether or not there is any memory area, the state of which is changed to the operating state (step S36). If it is determined that there is a memory area, the state of which is changed to the operating state (result of step S36: YES), the access controller 11 determines whether or not the requested data exists in the memory areas in the operating state (step S37).

If it is determined in step S37 described above that the requested data exists in the memory areas (result of step S37: YES), the access controller 11 sets the measured value of the counter for the memory area to the initial value (step S32). Next, the access controller 11 selects and outputs data stored in the data part 27 of a cache line 25 specified by the index of the memory address contained in the read request information in the memory area (step S33). In this case, since the data transferred from the main storage device are not needed any longer, the access controller 11 can discard the data transferred from the main storage device, for example.

If it is determined in step S37 described above that the requested data does not exist in the memory areas (result of step S37: NO), the access controller 11 determines whether or not the data are transferred from the main storage device (step S38). If it is determined that the data are transferred from the main storage device (result of step S38: YES), the access controller 11 outputs the data transferred from the main storage device (step S33) and writes the data into the cache memory 20 (step S39). The operation in step S39 is the same as that in step S16 (see FIG. 4) described above.

If it is determined in step S30 described above that the access controller 11 has received no read request information (result of step S30: NO), the access controller 11 determines whether or not there is any memory area for which the measured value of the unused time has reached the first threshold (step S40). If it is determined that there is a memory area for which the measured value of the unused time has reached the first threshold (result of step S40: YES), the access controller 11 instructs the power controller 13 to perform control to change the state of the memory area from the operating state to the standby state. The instructed power controller 13 performs control such that standby power is supplied to the memory area (step S41). In other words, the power controller 13 controls the power supply unit 40 to switch power supplied to the memory area to standby power.

When all the memory areas become in the standby mode (result of step S42: YES), the state of the cache device 100 is switched from the "partial standby mode" to the "all-standby mode".

Next, an example of data write operation in the partial standby mode will be described with reference to FIG. 7. An example of a case in which write operation based on one piece of write request information selected by the multiplexer 50 is performed will be described here.

Figure 7:
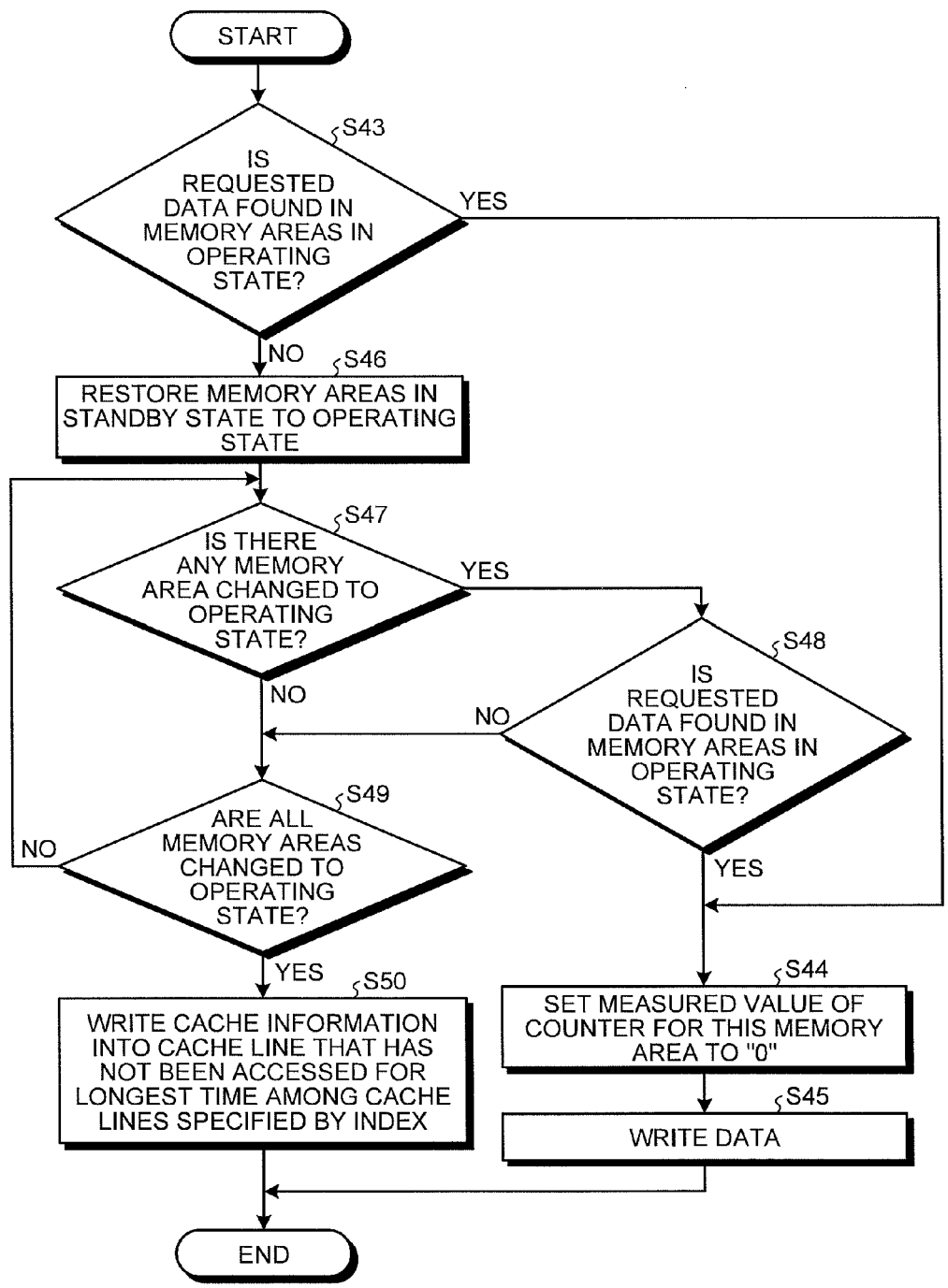
FIG. 7 is a flowchart illustrating an example of write operation in the partial standby mode according to the first embodiment.

As illustrated in FIG. 7, the access controller 11 first determines whether or not the requested data exists in the memory areas in the operating state (step S43). If it is determined that the requested data exists in the memory areas (result of step S43: YES), the access controller 11 sets the measured value of the counter for the memory area to the initial value (step S44). Next, the access controller 11 writes data requested to be written into the data part 27 of a cache line 25 specified by the index of the memory address contained in the write request information in the memory area (step S45).

If it is determined in step S43 described above that the requested data does not exist in the memory areas (result of step S43: NO), that is, if it is determined that the result is a mishit, the access controller 11 writes instructs the power controller 13 to change the memory areas from the standby state to the operating state. The instructed power controller 13 changes the memory areas from the standby state to the operating state (step S46). Next, the access controller 11 determines whether or not there is any memory area, the state of which is changed to the operating state (step S47). If it is determined that there is a memory area, the state of which is changed to the operating state (result of step S47: YES), the access controller 11 determines whether or not the requested data exists in memory areas in the operating state (step S48).

If it is determined in step S48 described above that the requested data exists in the memory areas (result of step S48: YES), the access controller 11 sets the measured value of the counter for the memory area to the initial value (step S44). Next, the access controller 11 writes data requested to be written into the data part 27 of a cache line 25 specified by the index of the memory address contained in the write request information in the memory area (step S45). If it is determined in step S48 described above that the requested data does not exist in the memory areas (result of step S48: NO), on the other hand, the access controller 11 determines whether or not all the memory areas are changed (restored) to the operating state (step S49). If it is determined that all the memory areas are changed to the operating state (result of step S49: YES), the access controller 11 writes cache information into the cache line 25 that has not been accessed for a longest time among the cache lines 25 specified by the index (step S50). The operation in step S50 is the same as that in step S24 (see FIG. 5) described above.

Next, exemplary operation of the cache device 100 in the "all-standby mode" will be described. First, an example of data read operation in the all-standby mode will be described with reference to FIG. 8.

Figure 8:
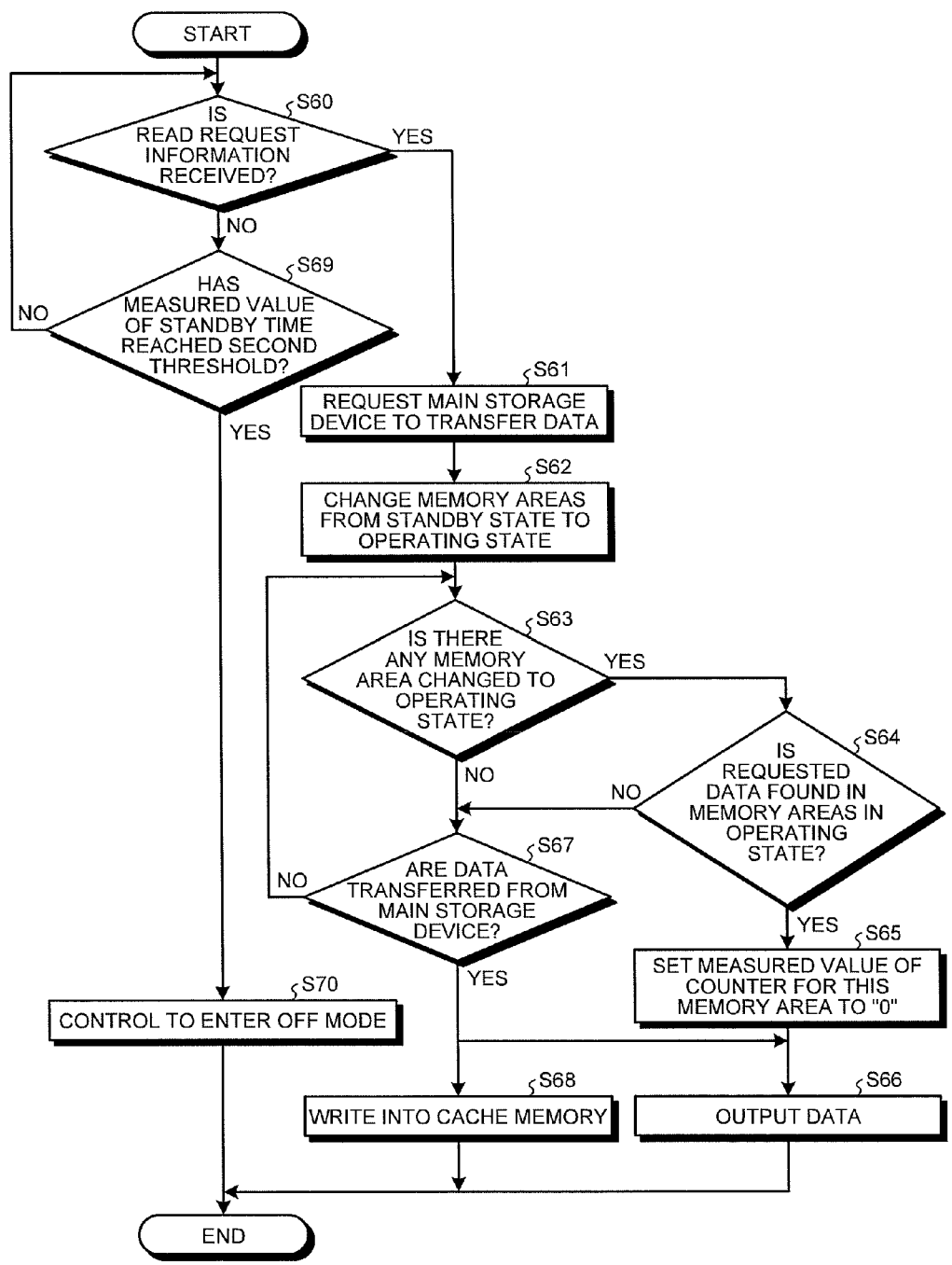
FIG. 8 is a flowchart illustrating an example of read operation in an all-standby mode according to the first embodiment.

As illustrated in FIG. 8, the access controller 11 first determines whether or not read request information is received (step S60). If it is determined that read request information is received (result of step S60: YES), the access controller 11 controls the multiplexer 50 so that the received read request information is selected and starts control of read operation based on the received read request information. First, the access controller 11 requests the main storage device to transfer data requested to be read (step S61). The access controller 11 also instructs the power controller 13 to change memory areas from the standby state to the operating state. The instructed power controller 13 changes the memory areas from the standby state to the operating state (step S62).

Next, the access controller 11 determines whether or not there is any memory area, the state of which is changed to the operating state (step S63). If it is determined that there is a memory area, the state of which is changed (restored) to the operating state (result of step S63: YES), the access controller 11 determines whether or not the requested data exists in memory areas in the operating state (step S64).

If it is determined in step S64 described above that the requested data exists in the memory areas (result of step S64: YES), the access controller 11 sets the measured value of the counter for the memory area to the initial value (step S65). Next, the access controller 11 selects and outputs data stored in the data part 27 of the cache line 25 specified by the index of the memory address contained in the read request information in the memory area (step S66). In this case, since the data transferred from the main storage device are not needed any longer, the access controller 11 can discard the data transferred from the main storage device, for example.

If it is determined in step S64 described above that the request data does not exist in the memory areas (result of step S64: NO), the access controller 11 determines whether or not the data are transferred from the main storage device (step S67). If it is determined that the data are transferred from the main storage device (result of step S67: YES), the access controller 11 outputs the data transferred from the main storage device (step S66) and writes the data into the cache memory 20 (step S68). The operation in step S68 is the same as that in step S16 (see FIG. 4) described above.

If it is determined in step S60 described above that the access controller 11 has received no read request information (result of step S60: NO), the access controller 11 determines whether or not the measured value of the standby time has reached the second threshold (step S69). If it is determined that the measured value of the standby time has reached the second threshold (result of step S69: YES), the access controller 11 instructs the power controller 13 to perform control to enter the "off mode". The instructed power controller 13 performs control to enter the "off mode" (step S70). More specifically, the power controller 13 controls the power supply unit 40 to stop the supply of power to the memory areas. As a result, the state of the cache device 100 is switched from the "all-standby mode" to the "off mode".

Next, an example of data write operation in the all-standby mode will be described with reference to FIG. 9. An example of a case in which write operation based on one piece of write request information selected by the multiplexer 50 is performed will be described here.

Figure 9:
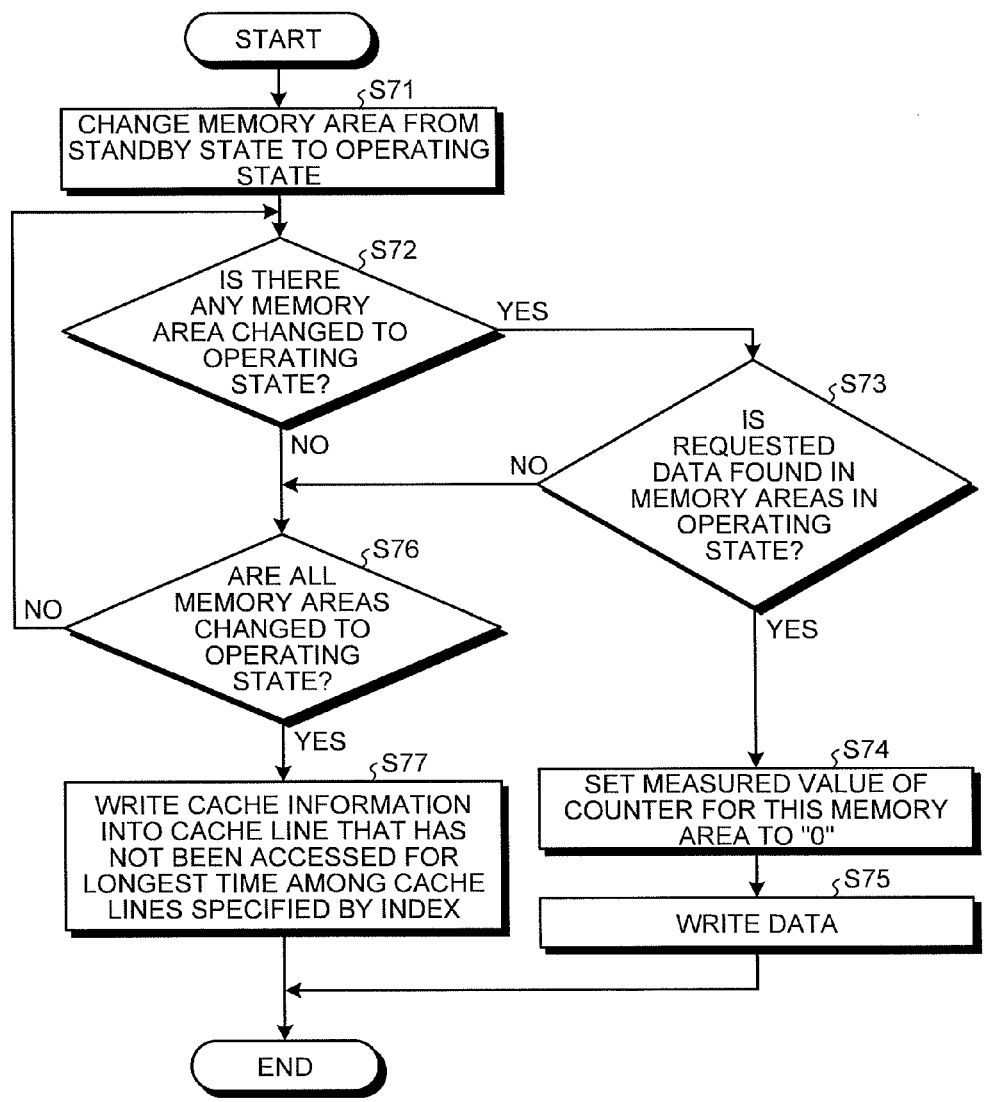
FIG. 9 is a flowchart illustrating an example of write operation in the all-standby mode according to the first embodiment.

As illustrated in FIG. 9, the access controller 11 first instructs the power controller 13 to change memory areas from the standby state to the operating state. The instructed power controller 13 changes the memory areas from the standby state to the operating state (step S71).

Next, the access controller 11 determines whether or not there is any memory area, the state of which is changed to the operating state (step S72). If it is determined that there is a memory area, the state of which is changed to the operating state (result of step S72: YES), the access controller 11 determines whether or not the requested data exists in the memory areas in the operating state (step S73).

If it is determined in step S73 described above that the requested data exists in the memory areas (result of step S73: YES), the access controller 11 sets the measured value of the counter for the memory area to the initial value (step S74). Next, the access controller 11 writes data requested to be written into the data part 27 of a cache line 25 specified by the index of the memory address contained in the write request information in the memory area (step S75). If it is determined in step S73 described above that the requested data does not exist in the memory areas (result of step S73: NO), on the other hand, the access controller 11 determines whether or not all the memory areas are changed to the operating state (step S76). If it is determined that all the memory areas are changed to the operating state (result of step S76: YES), the access controller 11 writes cache information into the cache line 25 that has not been accessed for a longest time among the cache lines 25 specified by the index contained in the memory address (step S77). The operation in step S77 is the same as that in step S24 (see FIG. 5) described above.

Furthermore, exemplary operation of the cache device 100 in the "off mode" is as follows. When read request information or write request information is selected by the multiplexer 50 in the "off mode", the access controller 11 instructs the power controller 13 to change, for all the memory areas, the state to the operating state. The instructed power controller 13 performs control to change, for all the memory areas, the state to the operating state. As a result, the state of the cache device 100 is switched from the "off mode" to the "normal operation mode". Subsequent operation is the same as that in the normal operation mode described above.

As described above, according to the present embodiment, since the standby power for a memory area that is highly likely to be accessed has a value closer to the operating power as compared to the value of the standby power for a memory area that is less likely to be accessed, the memory area that is highly likely to be accessed can be changed from the standby state to the operating state in a short time. Furthermore, it is possible to reduce power consumption by controlling the power supplied to a memory area that is less likely to be accessed to be a sufficiently small value as compared to the operating power. According to the present embodiment, it is therefore possible to provide a cache device with reduced power consumption and with ensured performance.

Next, a second embodiment will be described. Parts that are the same as those in the first embodiment described above will be designated by the same reference numerals and description thereof will not be repeated as appropriate.

Figure 10:
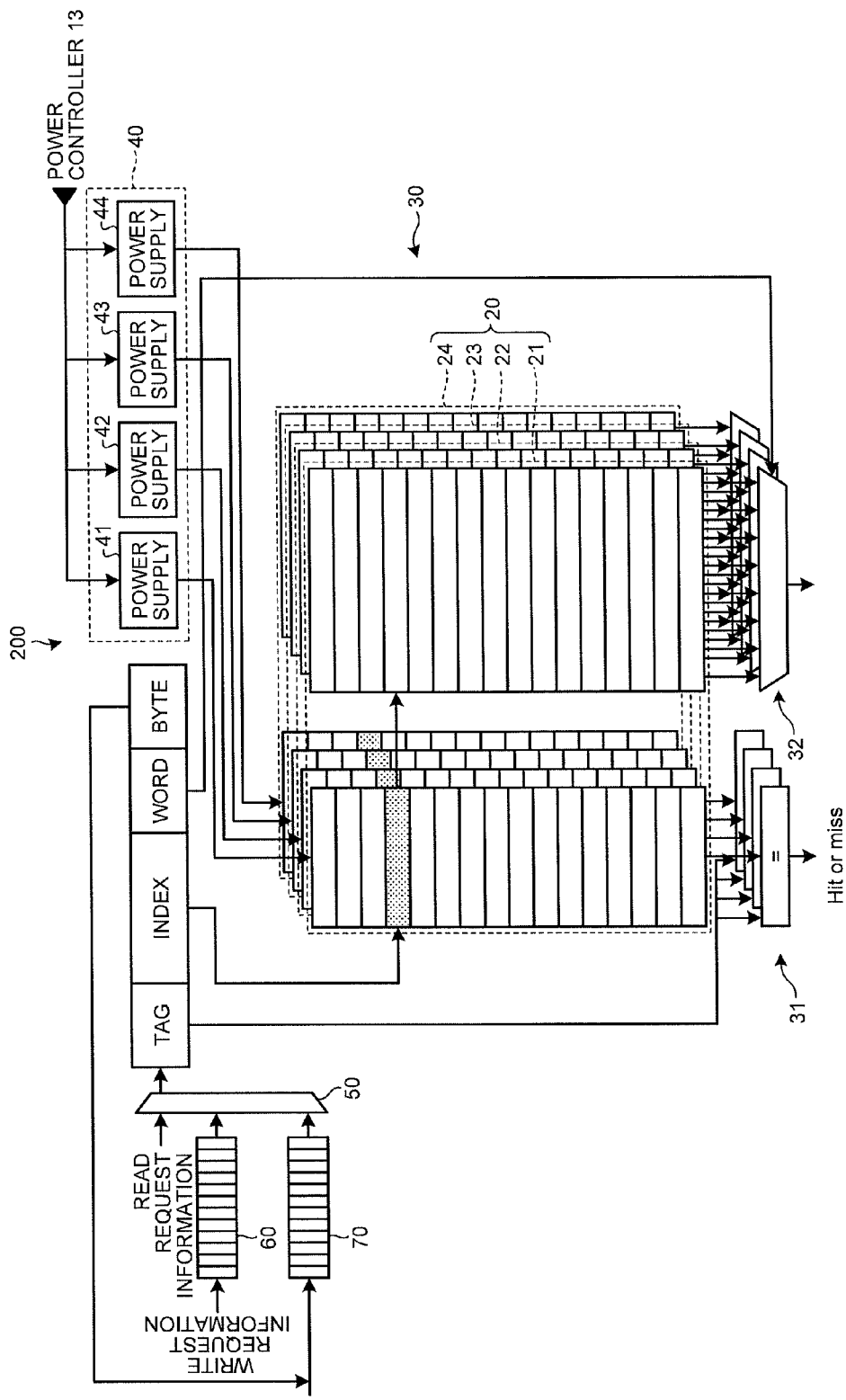
FIG. 10 is a diagram illustrating an exemplary configuration of a cache device according to a second embodiment.

FIG. 10 is a diagram illustrating an exemplary configuration of a cache device 200 according to the second embodiment. For convenience of description, the access controller 11, the counter 12 and the power controller 13 are not illustrated. As illustrated in FIG. 10, the cache device 200 is different from that in the first embodiment in that the cache device 200 further includes a second write buffer 70. Under the control of the access controller 11, the multiplexer 50 selects any of read request information output from the CPU, information stored in the first write buffer 60, and information stored in the second write buffer 70.

In the present embodiment, when the access controller 11 determines that the requested data does not exist in memory areas in the operating state in the control on write operation based on the write request information in the first write buffer 60, the access controller 11 performs control to move the write request information to the second write buffer 70.

More specifically, the access controller 11 determines whether or not a tag stored in the tag part 26 of a cache line 25 specified by the index in the memory address included in the write request information (write request information in the first write buffer 60) selected by the multiplexer 50 and a tag in the memory address contained in the write request information are identical for each memory area in the operating state. If it is determined that none of the tags are identical (if it is determined that the result is a mishit), the access controller 11 performs control to move the write request information to the second write buffer 70. Subsequently, the access controller 11 can control the multiplexer 50 to select another (typically an immediately following) piece of write request information stored in the first write buffer 60.

In addition, in the present embodiment, when write request information is stored in the second write buffer 70, the access controller 11 instructs the power controller 13 change memory areas from the standby state to the operating state. The instructed power controller 13 changes the memory areas from the standby state to the operating state. In other words, the power controller 13 controls the power supply unit 40 to switch power supplied to the memory areas such that the standby state thereof becomes an operating state. When all the memory areas are changed to the operating state, the access controller 11 controls write operation based on the write request information stored in the second write buffer 70.

Thus, the access controller 11 can control the write operation based on another piece of write request information stored in the first write buffer 60 until all the memory areas are changed to the operating state. As a result, when data (data requested to be written) specified by another piece of write request information in the first write buffer 60 are data that can be written in any of memory areas already in the operating state, for example, next write operation can be performed without waiting for memory areas from the standby state to be changed to the operating state. In other words, it is possible to prevent data that can be written without waiting for memory areas to be driven from being kept waiting for a long time for write operation to wait for the memory areas to be driven, and thus prevent overflow of the first write buffer 60 itself. According to the present embodiment, it is therefore possible to reduce performance overhead owing to write operation.

When read request information from the CPU is received until all the memory areas are changed to the operating state, the access controller 11 can control the multiplexer 50 to select the received read request information first. In other words, when read request information from the CPU is received until all the memory areas are changed to the operating state, the access controller 11 can control read operation based on the received read request information. Since specific details of the control on the read operation or the control on the write operation by the access controller 11 are similar to those described in the first embodiment, details description thereof will not be repeated here.

While the counters are provided individually for the respective memory areas in the embodiments described above, the configuration is not limited thereto and one counter may be shared for several memory areas. As an example, a case in which one counter is shared for all the memory areas (ways) will be described. In this example, the counter resets a measured value to an initial value each time read request information or write request information (access request information) is received. In addition, the first threshold is set to different values for different memory areas in this example, but the first threshold is not limited thereto and may be set to the same value. In the following, exemplary operation in each mode will be described mainly on the differences from the first embodiment described above. Description overlapping with that of the first embodiment described above will not be repeated as appropriate.

Figure 11:
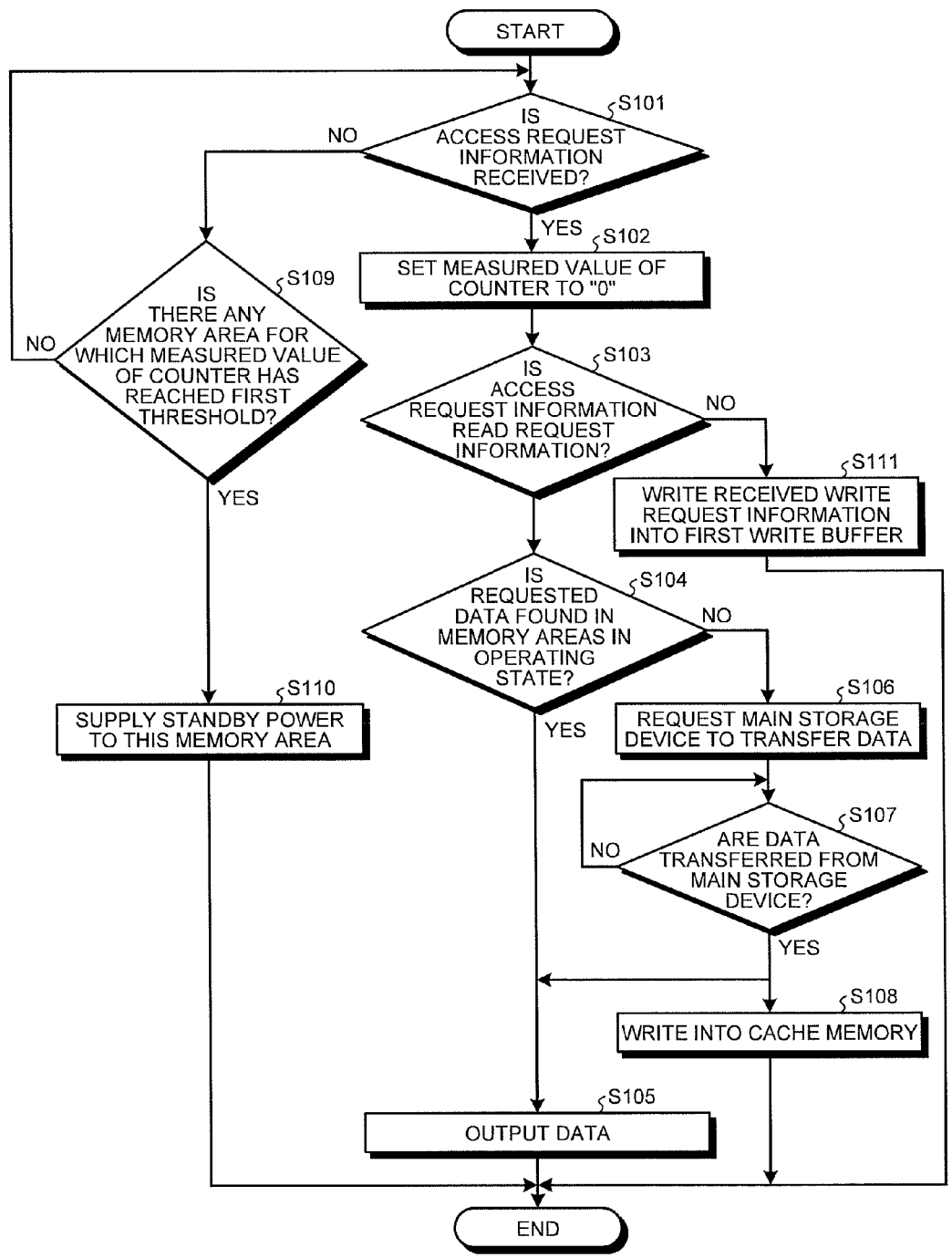
FIG. 11 is a flowchart illustrating exemplary operation of a cache device in a normal operation mode according to a modification.

FIG. 11 is a flowchart illustrating exemplary operation in a normal operation mode. First, the access controller 11 determines whether or not access request information is received (step S101). If it is determined that access request information is received (result of step S101: YES), the access controller 11 sets (resets) the measured value of the counter to the initial value (step S102).

If the received access request information is read request information (result of step S103: YES), the access controller 11 controls the multiplexer 50 to select the received read request information and starts control of read operation based on the received read request information. Operation in subsequent steps S104 to S108 is the same as that in steps S11 to S16 in FIG. 4 except that the process of step S12 in FIG. 4 is not performed.

If the received access request information is write request information (result of step S103: NO), on the other hand, the access controller 11 writes the received write request information into the first write buffer 60 (step S111).

If it is determined in step S101 described above that no access request information is received (result of step S101: NO), the access controller 11 determines whether or not there is any memory area for which the measured value of the counter has reached the first threshold (step S109). If it is determined that there is a memory area for which the measured value of the counter has reached the first threshold (result of step S109: YES), the access controller 11 instructs the power controller 13 to perform control to change the state of the memory area from the operating state to the standby state. The instructed power controller 13 performs control such that standby power is supplied to the memory area (step S110). As a result, the cache device changes from the "normal operation mode" to the "partial standby mode".

Figure 12:
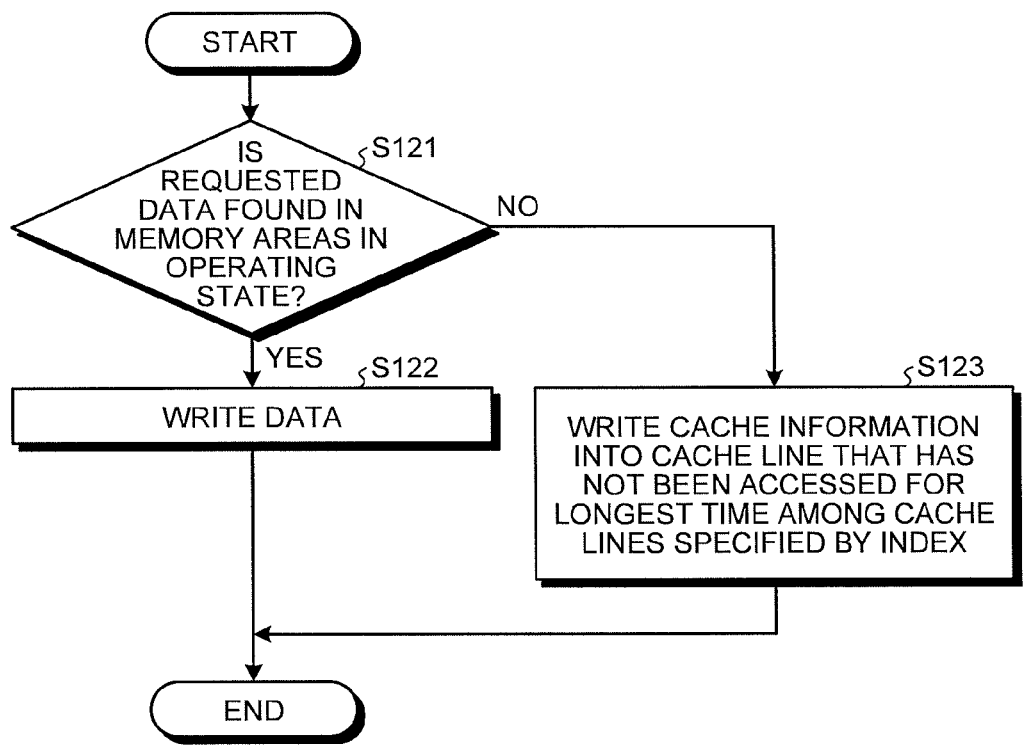
FIG. 12 is a flowchart illustrating exemplary operation of a cache device in a normal operation mode according to the modification.

FIG. 12 is a flowchart illustrating an example of data write operation in the normal operation mode. The operation in steps S121 to S123 illustrated in FIG. 12 is the same as that in steps S21 to S24 in FIG. 5 except that the process of step S22 in FIG. 5 is not performed.

Figure 13:
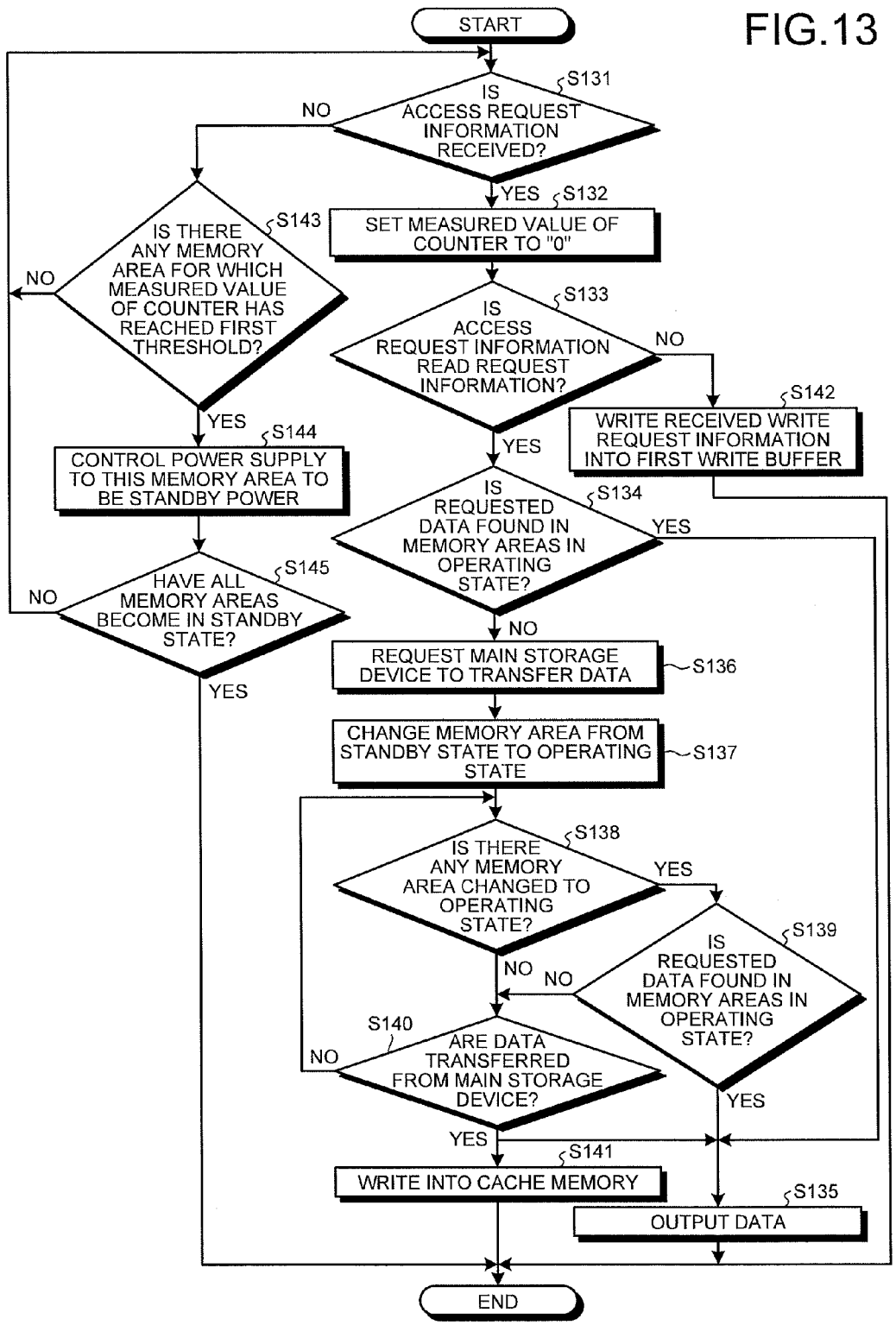
FIG. 13 is a flowchart illustrating exemplary operation of a cache device in a partial standby mode according to the modification.

FIG. 13 is a flowchart illustrating exemplary operation in the partial standby mode. First, the access controller 11 determines whether or not access request information is received (step S131). If it is determined that access request information is received (result of step S131: YES), the access controller 11 sets the measured value of the counter to the initial value (step S132).

If the received access request information is read request information (result of step S133: YES), the access controller 11 controls the multiplexer 50 to select the received read request information and starts control of read operation based on the received read request information. Operation in subsequent steps S134 to S141 is the same as that in steps S31 to S39 in FIG. 6 except that the process of step S32 in FIG. 6 is not performed.

If the received access request information is write request information (result of step S133: NO), on the other hand, the access controller 11 writes the received write request information into the first write buffer 60 (step S142).

If it is determined in step S131 described above that no access request information is received (result of step S131: NO), the access controller 11 determines whether or not there is any memory area for which the measured value of the counter has reached the first threshold (step S143). If it is determined that there is a memory area for which the measured value of the counter has reached the first threshold (result of step S143: YES), the access controller 11 instructs the power controller 13 to perform control to change the state of the memory area from the operating state to the standby state. The instructed power controller 13 performs control such that standby power is supplied to the memory area (step S144).

When all the memory areas become in the standby mode (result of step S145: YES), the state of the cache device is switched from the "partial standby mode" to the "all-standby mode". The access controller 11 then starts measurement of the standby time.

Figure 14:
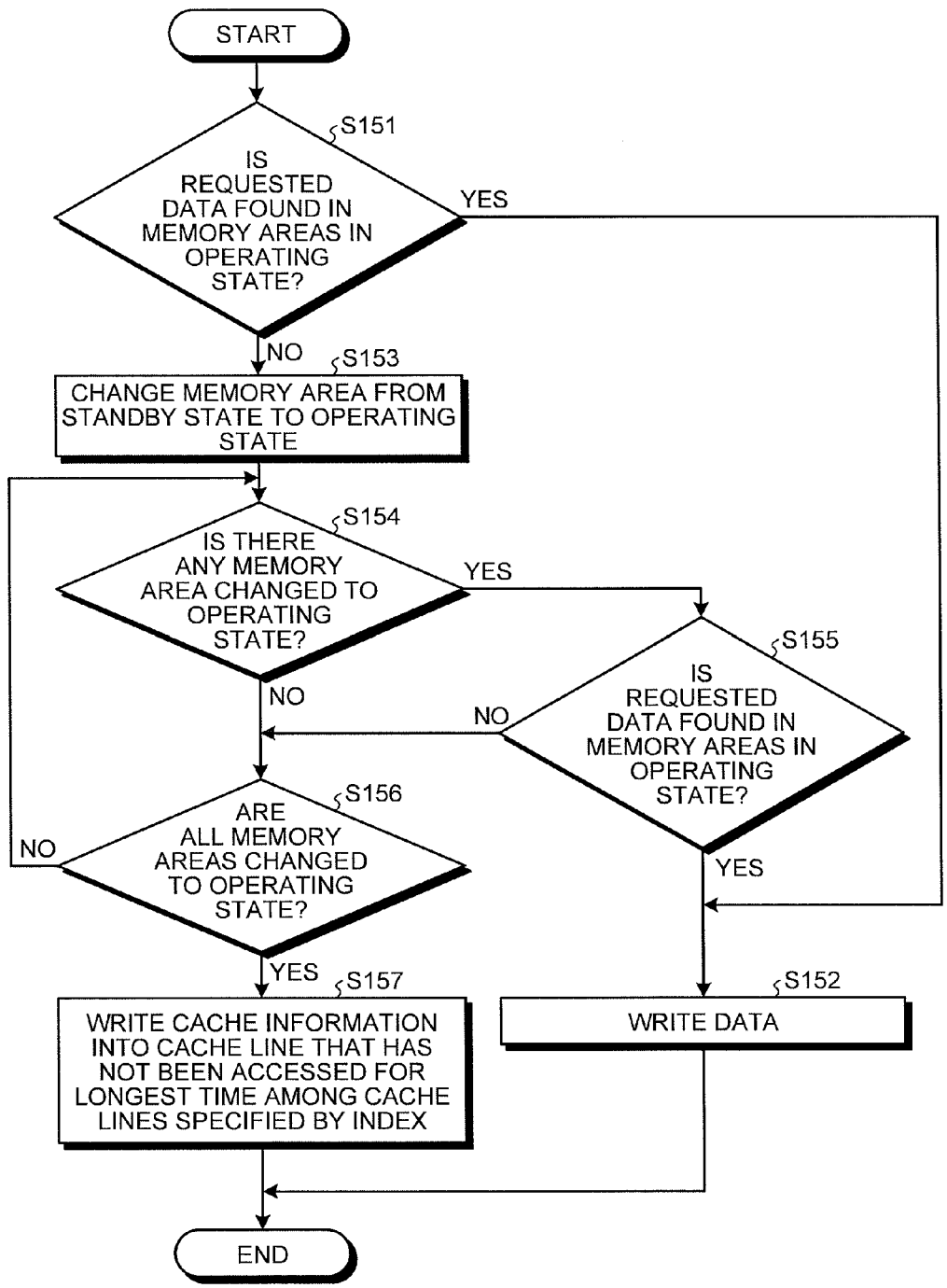
FIG. 14 is a flowchart illustrating exemplary operation of a cache device in a partial standby mode according to the modification.

FIG. 14 is a flowchart illustrating an example of data write operation in the partial standby mode. The operation in steps S151 to S157 illustrated in FIG. 14 is the same as that in steps S43 to S50 in FIG. 7 except that the process of step S44 in FIG. 7 is not performed.

Figure 15:
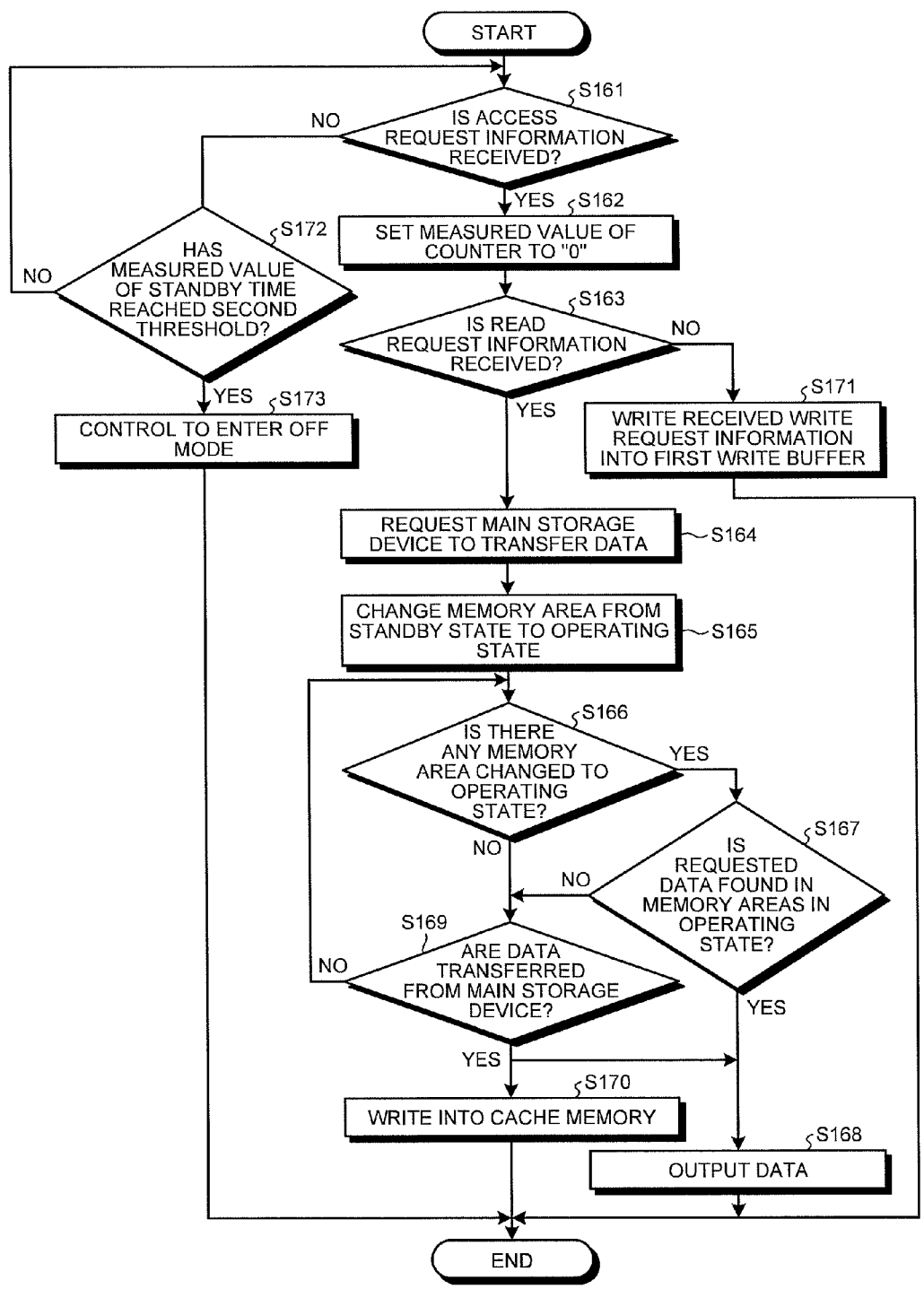
FIG. 15 is a flowchart illustrating exemplary operation of a cache device in an all-standby mode according to the modification.

FIG. 15 is a flowchart illustrating exemplary operation in the all-standby mode. First, the access controller 11 determines whether or not access request information is received (step S161). If it is determined that access request information is received (result of step S161: YES), the access controller 11 sets the measured value of the counter to the initial value (step S162).

If the received access request information is read request information (result of step S163: YES), the access controller 11 controls the multiplexer 50 to select the received read request information and starts control of read operation based on the received read request information. Operation in subsequent steps S164 to S170 is the same as that in steps S61 to S68 in FIG. 8 except that the process of step S65 in FIG. 8 is not performed.

If the received access request information is write request information (result of step S163: NO), on the other hand, the access controller 11 writes the received write request information into the first write buffer 60 (step S171).

If it is determined in step S161 described above that no access request information is received (result of step S161: NO), the access controller 11 determines whether or not there is any memory area for which the measured value of the standby time has reached the second threshold (step S172). If it is determined that the measured value of the standby time has reached the second threshold (result of step S172: YES), the access controller 11 instructs the power controller 13 to perform control to enter the "off mode". The instructed power controller 13 performs control to enter the "off mode" (step S173).

Figure 16:
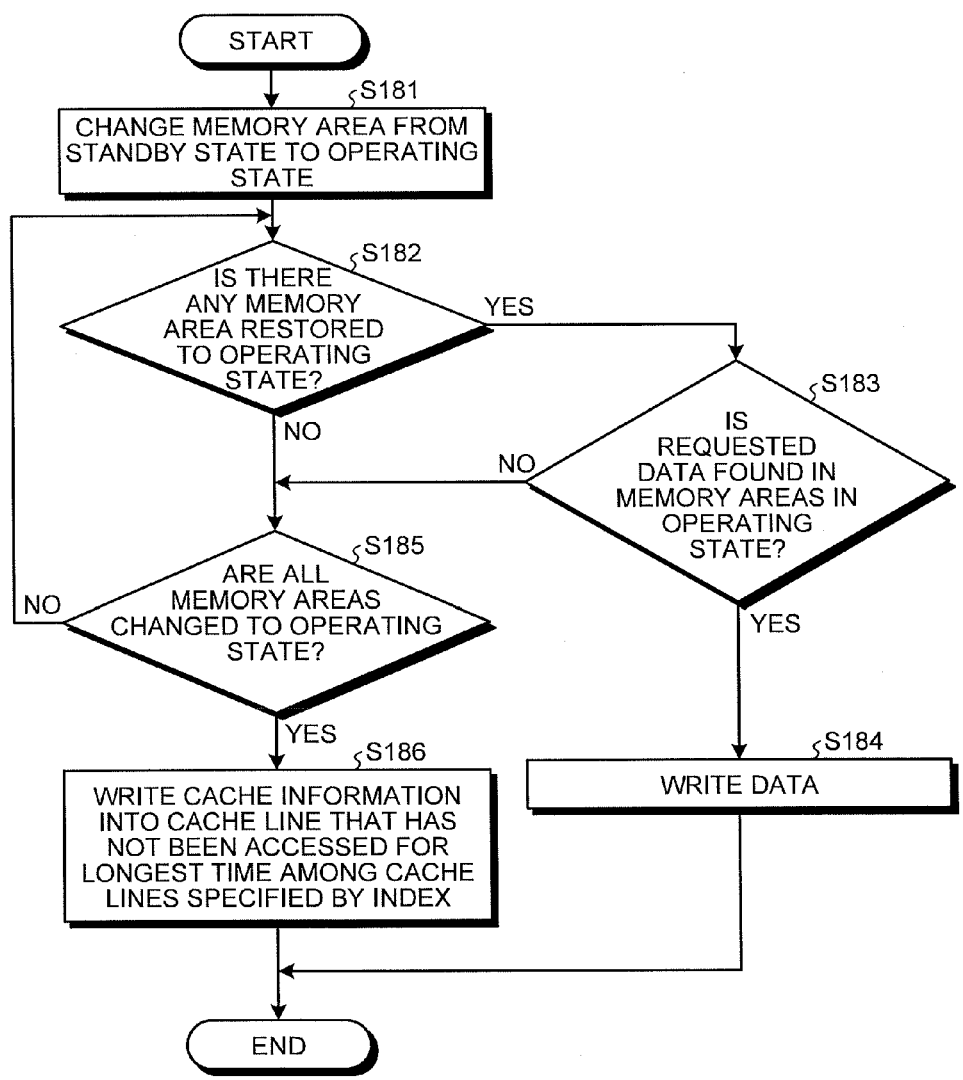
FIG. 16 is a flowchart illustrating exemplary operation of a cache device in an all-standby mode according to the modification.

FIG. 16 is a flowchart illustrating an example of data write operation in the all-standby mode. The operation in steps S181 to S186 of FIG. 16 is the same as that in steps S71 to S77 in FIG. 9 except that the process of step S74 in FIG. 9 is not performed.

Exemplary operation in the "off mode" is as follows. When access request information is received in the "off mode", the access controller 11 instructs the power controller 13 to change, for all the memory areas, the state to the operating state. The instructed power controller 13 performs control to change, for all the memory areas, the state to the operating state. As a result, the state of the cache device is switched from the "off mode" to the "normal operation mode". The access controller 11 then sets the measured value of the counter to the initial value. Subsequent operation is the same as that in the normal operation mode described above (operation in step S103 and subsequent steps in FIG. 11).

Note that any method may be used for setting the first threshold for each memory area, and the first threshold may be set to a smaller value for a memory area that is less likely to be accessed, for example. According to such a configuration, it is possible to quickly change the state of a memory area that is less likely to be accessed to the standby state.

Alternatively, the first threshold may be set to a smaller value for a memory area that is more likely to be accessed, for example. According to such a configuration, it is possible to actively change the state of a memory area that is more likely to be accessed to the standby state. Furthermore, the value of the first threshold for a memory area that is less likely to be accessed may be set to a value smaller than a typically assumed access interval so that the states of memory areas that are highly likely to be accessed are actively changed to the standby state while the power consumption of memory areas that are less likely to be accessed can be reduced.

Furthermore, while the cache devices according to the embodiments described above are in a four-way set associative system, the cache devices are not limited thereto and may be in a two-way set associative system or an eight-way set associative system, for example. In other words, the cache devices may be in an n-way set associative system ($n \geq 2$).

While the cache memories in the embodiments described above are nonvolatile memories, the cache memories are not limited thereto and may be volatile memories, for example.

The values of the first threshold and the second threshold can be arbitrarily set. For example, the first threshold can be set to a value smaller than the second threshold so that the states of memory areas that are highly likely to be accessed are also actively changed to the standby state. As a result, the power consumption can be reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A cache device comprising:
    a cache memory including a plurality of memory areas associated with a plurality of ways, respectively;
    an access controller configured to control access to the memory areas;
    a plurality of counters respectively associated with the memory areas, each of the counters configured to determine if an unused time of a respective one of the memory areas is greater than a predetermined time, the unused time representing a time period during which the respective memory area has not been accessed;
    a power controller configured to control power supplied to the memory areas individually such that power supplied to a memory area for which the unused time is greater than the predetermined time is standby power that is lower than operating power, the operating power being power required for reading or writing data with respect to the memory area;
    a first write buffer configured to store write request information for requesting to write data; and
    a second write buffer, wherein
        the power controller controls power supplied to a memory area such that a first standby power for a memory area that has a first likelihood of being accessed has a value closer to the operating power than a value of a second standby power for a memory area that has a second likelihood of being accessed, the first likelihood being greater than the second likelihood, and
        when the access controller determines that a requested data does not exist in the memory areas in an operating state, representing a state in which the operating power is supplied in controlling write operation, based on tags specified in the index in the memory address and tags associated with the write request information stored in the first write buffer, the access controller performs control to move the write request information stored in the first write buffer to the second write buffer to select another piece of write request information stored in the first write buffer.

2. The device according to claim 1, wherein after performing control to move the write request information stored in the first write buffer to the second write buffer, the access controller controls write operation based on another piece of write request information stored in the first write buffer.

3. The device according to claim 1, wherein when the write request information is stored in the second write buffer, the power controller performs control to change a memory area in a standby state representing a state in which the standby power is supplied thereto to the operating state.

4. The device according to claim 3, wherein when all the memory areas are changed to the operating state, the access controller controls write operation based on the write request information stored in the second write buffer.

5. The device according to claim 1, wherein
    the write request information contains a memory address indicating a location in a main storage device and data requested to be written,
    each of the memory areas includes a plurality of cache lines in each of which a tag part for storing a tag that is part of the memory address and a data part for storing data are associated,
    the memory address contains an index for specifying one of the cache lines,
    the access controller determines whether the tag stored in the tag part in the cache line specified by the index in the memory address contained in the write request information and the tag in the memory address contained in the write request information are identical to each other for each memory area in the operating state, and
    when it is determined that none of the tags are identical, the access controller performs control to move the write request buffer stored in the first write buffer to the second write buffer.

6. The device according to claim 1, wherein the cache memory is a nonvolatile memory.

7. A cache system comprising an n-way set associative cache device (n≥2) provided between a processing device and a main storage device, the cache device including:
    a cache memory including a plurality of memory areas associated with a plurality of ways, respectively;
    an access controller configured to control access to the memory areas;
    a plurality of counters respectively associated with the memory areas, each of the counters configured to determine if an unused time of a respective one of the memory areas is greater than a predetermined time, the unused time representing a time period during which the respective memory area has not been accessed;
    a power controller configured to control power supplied to the memory areas individually such that power supplied to a memory area for which the unused time is greater than the predetermined time is standby power that is lower than operating power, the operating power being power required for reading or writing data with respect to the memory area;

a first write buffer configured to store write request information for requesting to write data; and a second write buffer, wherein the power controller controls power supplied to a memory area such that a first standby power for a memory area that has a first likelihood of being accessed has a value closer to the operating power than a value of a second standby power for a memory area that has a second likelihood of being accessed, the first likelihood being greater than the second likelihood, and when the access controller determines that a requested data does not exist in the memory areas in an operating state, representing a state in which the operating power is supplied in controlling write operation, based on tags specified in the index in the memory address and tags associated with the write request information stored in the first write buffer, the access controller performs control to move the write request information stored in the first write buffer to the second write buffer to select another piece of write request information stored in the first write buffer.

8. A control method comprising:

controlling access to memory areas of a cache memory including a plurality of memory areas associated with a plurality of ways, respectively;

associating the memory areas individually with a plurality of counters, each of the counters determining if an unused time of a respective one of the memory areas is greater than a predetermined time, the unused time representing a time period during which the respective memory area has not been accessed;

controlling power supplied to the memory areas individually such that power supplied to a memory area for which the unused time is greater than the predetermined time is standby power that is lower than operating power, the operating power being power required for reading or writing data with respect to the memory area;

controlling power supplied to a memory area such that a first standby power for a memory area that has a first likelihood of being accessed has a value closer to the operating power than a value of a second standby power for a memory area that has a second likelihood of being accessed, the first likelihood being greater than the second likelihood; and when it is determined that a requested data does not exist in the memory areas in an operating state, representing a state in which the operating power is supplied in controlling write operation, based on tags specified in the index in the memory address and tags associated with the write request information for requesting to write data stored in a first write buffer, moving the write request information stored in the first write buffer to a second write buffer to select another piece of write request information stored in the first write buffer.

* * * * *